July 21, 1953  A. J. LEWUS  2,646,537
INDUCTION MOTOR OF THE CAPACITOR TYPE
Filed Sept. 13, 1951
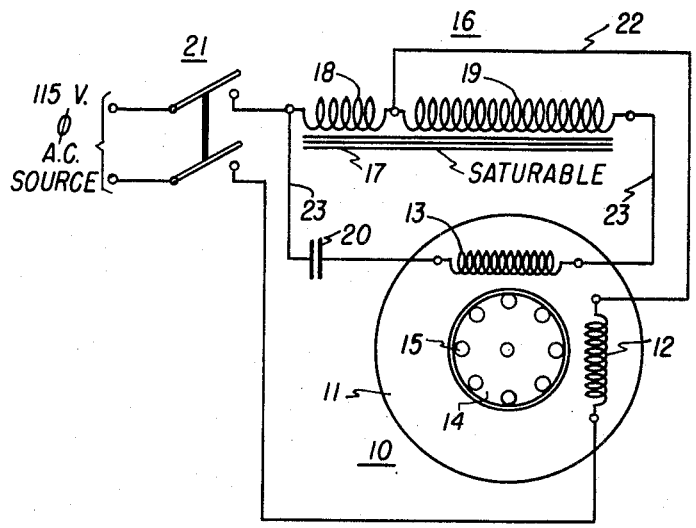
INVENTOR.
Alexander J. Lewus
BY
Smith, Olsen + Baird
Attys.

Patented July 21, 1953

2,646,537

UNITED STATES PATENT OFFICE 2,646,537

INDUCTION MOTOR OF THE CAPACITOR TYPE

Alexander J. Lewus, Cicero, Ill.

Application September 13, 1951, Serial No. 246,483

8 Claims. (Cl. 318—221)

1

The present invention relates to induction motors of the capacitor type and more particularly to improved starting and running circuits for such motors. This application is a continuation in part of the copending application of Alexander J. Lewus, Serial No. 119,593, filed October 5, 1949, which is a continuation of Serial No. 48,305, filed September 8, 1948, which is a continuation of Serial No. 759,386, filed July 7, 1947, all now abandoned.

It is the general object of the present invention to provide in a single phase induction motor of the capacitor type, an improved and simplified starting and running circuit that develops a large starting torque in the motor and that does not require removal from the circuit of the associated capacitor during running of the motor.

Another object of the invention is to provide in a circuit of the character noted, an improved arrangement of a transformer having a saturable magnetic core and a capacitor of the dry electrolytic type, whereby the starting and running currents in the circuit are automatically controlled to insure quick starting of the motor and to prevent damage to the capacitor permanently connected in the circuit.

Further features of the invention pertain to the particular connection and arrangement of the elements of the electric motor and of the starting and running circuit therefor, whereby the above-outlined and additional operating features thereof are attained.

The invention, both as to its organization and method of operation, together with further objects and advantages thereof will best be understood by reference to the following specification taken in connection with the accompanying drawing, in which the single figure is a schematic electric diagram of an induction motor of the capacitor type and of the starting and running circuit therefor embodying the present invention.

Referring now to the single figure of the drawing, there is illustrated an induction motor 10 and a starting and running circuit therefor embodying the features of the present invention. The motor 10 is of the single phase split phase capacitor type including a stator 11 provided with angularly displaced main and auxiliary windings 12 and 13, and a rotor 14 provided with a squirrel-cage winding 15. Preferably the windings 12 and 13 are arranged in quadrature relation, the auxiliary winding 13 having starting and running impedances that are substantially

2 greater than the respective starting and running impedances of the main winding 12. The motor 10 may be of the fractional horsepower type or may have a rating as high as about 5 H. P.

The circuit comprises a transformer 16 including an ordinary saturable magnetic core 17 provided with primary and secondary windings 18 and 19. The windings 18 and 19 comprise two sections of an autotransformer, the secondary winding 19 including a number of turns considerably greater than the number of turns of the primary winding 18. Also the circuit includes a capacitor 20 of the paper or dry electrolytic type that may consist of one or more individual cells either of the polarized or nonpolarized type, the capacitor 20 having a relatively small capacitance and a high voltage rating. Finally the circuit arrangement comprises a source of single phase alternating current supply that may be a commercial source having a voltage of 115 volts and a substantially sinusoidal wave form, as well as a control switch 21 for governing the connection and disconnection of the source of current supply with respect to the circuit.

More particularly a common connection 22 is provided between one terminal of the primary winding 18 and one terminal of the secondary winding 19 and one terminal of the main winding 12, the other terminal of the primary winding 18 being connected to one terminal of the switch 21, and the other terminal of the main winding 12 being connected to the other terminal of the switch 21. Also a fixed connection 23 is provided that bridges the capacitor 20 and the auxiliary winding 13 in series circuit relation across the other terminal of the primary winding 18 and the other terminal of the secondary winding 19. As previously noted, the magnetic core 17 of the transformer 16 is of the saturable type, the magnetic core 17 being saturated by the starting currents in the circuit and being unsaturated by the running currents in the circuit. Also the starting and running impedances of the main winding 12 are considerably higher than the impedance of the primary winding 18.

Considering now the operation of the motor 10, when the control switch 21 connected to the source of current supply is closed, the primary winding 18 and the main winding 12 are energized directly in series circuit relation; while the voltage drop across the primary winding 18 and the voltage induced in the secondary winding 19 are applied in cumulative relation directly across the auxiliary winding 13 and the capacitor 20 in series circuit relation. The main winding 12 has a relatively low starting impedance, whereby a relatively large starting current traverses the primary winding 18 and the main winding 12, the starting current traversing the primary winding 18 effecting saturation of the magnetic core 17 so that the starting voltage induced in the secondary winding 19 is both relatively high and of a sharply peaked wave form. Moreover the voltage drop across the primary winding 18 is relatively high, and the voltage drop across the primary winding 18 and the voltage induced in the secondary winding 19 are cumulative and are added vectorially and applied across the auxiliary winding 13 and the capacitor 20 in series circuit relation. Moreover the starting impedance of the auxiliary winding 13 is relatively low, whereby the starting current traversing the auxiliary winding 13 is relatively large. Further the capacitor 20 dephases the starting current traversing the auxiliary winding 13 substantially with respect to the starting current traversing the main winding 12, the angle therebetween being nearly 90°. Accordingly the relatively large dephased starting currents respectively traversing the main winding 12 and the auxiliary winding 13 disposed in quadrature relation develop a high starting torque between the rotating magnetic field in the stator 11 and the squirrel-cage winding 15 carried by the rotor 14, thereby to initiate break-away and acceleration of the rotor 14.

As the rotor 14 is accelerated toward the synchronous speed of the motor 10 and into a speed somewhat in excess of 50% of the synchronous speed mentioned, the non-linear characteristics of the motor 10 and of the transformer 16 change rather abruptly due fundamentally to the increasing impedances of the main winding 12 and the auxiliary winding 13 as a consequence of the induction therebetween and the rotating squirrel-cage winding 15. Accordingly at the speed mentioned, the starting currents respectively traversing the main winding 12 and the auxiliary winding 13 are abruptly reduced and further reduction thereof is effected as the rotor 14 gains speed.

Ultimately as the rotor 14 gains its normal running speed, somewhat below the synchronous speed by the slip speed, the running impedances of the main winding 12 and the auxiliary winding 13 are substantially increased with respect to the starting impedances thereof. More particularly the running impedance of the main winding 12 is relatively high, whereby the current traversing the primary winding 18 is relatively small in order that the magnetic core 17 is no longer saturated so that the voltage induced in the secondary winding 19 is of substantially sinusoidal wave form corresponding substantially to the wave form of the source of alternating current supply. Moreover the voltage induced in the secondary winding 19 by the running current traversing the primary winding 18 is greatly reduced, as well as is the voltage drop across the primary winding 19. Accordingly at this time, the voltage drop across the primary winding 18 and the voltage induced in the secondary winding 19, although cumulative, are relatively small so that a small operating current traverses the auxiliary winding 13 and the capacitor 20. Hence the motor 10 runs substantially entirely as a single phase induction motor, substantially all of the power supplied thereto being supplied by the operating current traversing the main winding 12, the operating current traversing the auxiliary winding 13 being so small that it is not necessary to disconnect the capacitor 20 from its circuit position in series relation with the auxiliary winding 13. Specifically the operating current traversing the capacitor 20 is sufficiently small that there is no damage to the capacitor 20 and it may take the form of one or more individual dry electrolytic cells, either of the polarized or non-polarized type, as previously noted.

For example, employing a ⅙ H. P. motor of the character described having a synchronous speed of 1800 R. P. M., and operative at approximately 1750 R. P. M. at full load, it was determined that the starting and running currents of the main winding were approximately 9.0 and 2.6 amperes, respectively, and that the starting and running currents of the auxiliary winding were approximately 2.00 and 0.22 amperes, respectively. In this circuit arrangement, the primary and secondary windings comprised 150 and 600 turns, respectively, and the capacitor had a capacitance of about 15 microfarads. Moreover the motor developed a starting torque that was somewhat in excess of 200% of the normal running torque thereof at the rated H. P. noted.

In view of the foregoing, it is apparent that there has been provided a single phase split phase induction motor of the capacitor type and a starting and running circuit therefor of improved connection and arrangement that develops a high starting torque in the motor and that does not require removal from the circuit of the associated capacitor during running of the motor.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. In combination, an induction motor including a stator provided with angularly displaced main and auxiliary windings and a rotor provided with a squirrel-cage winding, a transformer including a saturable magnetic core provided with primary and secondary windings, a common connection between one terminal of said primary winding and one terminal of said secondary winding and one terminal of said main winding, a capacitor, and a fixed connection bridging said capacitor and said auxiliary winding in series relation across the other terminal of said primary winding and the other terminal of said secondary winding, said other terminal of said primary winding and the other terminal of said main winding being connectible to a source of single phase alternating current supply having a substantially sinusoidal wave form to effect starting and running of said rotor, the starting and running impedances of said main winding being respectively low and high with respect to each other so that said magnetic core is respectively saturated and unsaturated by the starting and running currents traversing said primary winding, said starting and running currents traversing said primary winding respectively inducing peaked starting and substantially sinusoidal running voltages in said secondary winding, the starting and running voltages induced in said secondary winding being respectively high and low with respect to each other and the starting and running impedances of said auxiliary winding being respectively low and high with respect to each other so that the starting and running currents traversing said capacitor and said auxiliary winding are respectively high and low with respect to each other, said capacitor effecting a substantial dephasing of the starting current traversing said auxiliary winding with respect to the starting current traversing said main winding so as to produce a substantial starting torque between said stator and said rotor.

2. The combination set forth in claim 1, wherein the voltage drop across said primary winding and the voltage induced in said secondary winding are in cumulative relation.

3. The combination set forth in claim 2, wherein the number of turns of said secondary winding is considerably greater than the number of turns of said primary winding.

4. The combination set forth in claim 1, wherein the starting and running impedances of said main winding are considerably higher than the impedance of said primary winding, and the starting and running impedances of said auxiliary winding are substantially higher than the respective starting and running impedances of said main winding.

5. In combination, an induction motor including a stator provided with angularly displaced main and auxiliary windings and a rotor provided with a squirrel-cage winding, a transformer including a saturable magnetic core provided with primary and secondary windings, a common connection between one terminal of said primary winding and one terminal of said secondary winding and one terminal of said main winding, a capacitor, a fixed connection bridging said capacitor and said auxiliary winding in series relation across the other terminal of said primary winding and the other terminal of said secondary winding, a source of single phase alternating current supply, and switching means for connecting said other terminal of said primary winding and the other terminal of said main winding to said source to effect starting and running of said rotor, said magnetic core being respectively saturated and unsaturated by the starting and running currents traversing said primary winding, said capacitor effecting a substantial dephasing of the starting current traversing said auxiliary winding with respect to the starting current traversing said main winding.

6. The combination set forth in claim 5, wherein said capacitor is of the dry electrolytic type.

7. The combination set forth in claim 6, wherein said dry electrolytic capacitor is of the polarized type.

8. The combination set forth in claim 6, wherein said dry electrolytic capacitor is of the non-polarized type.

ALEXANDER J. LEWUS.

References Cited in the file of this patent

UNITED STATES PATENTS

| Number | Name | Date |
|---|---|---|
| 479,727 | Stanley et al. | July 26, 1892 |
| 505,859 | Stanley et al. | Oct. 3, 1893 |
| 1,433,725 | Jennings | Oct. 31, 1922 |
| 1,708,910 | Spencer | Apr. 9, 1929 |
| 1,844,093 | Kennedy | Feb. 9, 1932 |
| 1,925,882 | Smith | Sept. 5, 1933 |
| 2,028,934 | Kennedy | Jan. 28, 1936 |
| 2,091,665 | Weber | Aug. 31, 1937 |
| 2,120,321 | Bargdill | June 14, 1938 |
| 2,253,961 | Stonehill | Aug. 26, 1941 |